United States Patent
Althof et al.

(10) Patent No.: US 7,861,695 B2
(45) Date of Patent: Jan. 4, 2011

(54) DEVICE FOR DELIVERING FUEL OUT OF A FUEL TANK

(75) Inventors: Andreas Althof, Dortmund (DE); Stefan Fuehling, Wetter (DE); Christian Krogull, Witten (DE); Knut Meyer, Essen (DE); Frank Reiter, Haan Rheinl (DE)

(73) Assignee: Continental Automotive GmbH, Hannover (DE)

( * ) Notice: Subject to any disclaimer, the term of this patent is extended or adjusted under 35 U.S.C. 154(b) by 568 days.

(21) Appl. No.: 11/994,590

(22) PCT Filed: Jun. 27, 2006

(86) PCT No.: PCT/EP2006/063571

§ 371 (c)(1),
(2), (4) Date: Jan. 3, 2008

(87) PCT Pub. No.: WO2007/003526

PCT Pub. Date: Jan. 11, 2007

(65) Prior Publication Data

US 2008/0223865 A1     Sep. 18, 2008

(30) Foreign Application Priority Data

Jul. 4, 2005     (DE) .................. 10 2005 031 430

(51) Int. Cl.
*F02M 33/08*     (2006.01)
*F02M 33/02*     (2006.01)

(52) U.S. Cl. ..................... 123/518; 123/509

(58) Field of Classification Search .......... 123/518, 123/509, 519, 520, 198 D, 514, 521; 220/746, 220/749

See application file for complete search history.

(56) References Cited

U.S. PATENT DOCUMENTS 2,640,627 A * 6/1953 Doelter ....................... 220/749

(Continued)

FOREIGN PATENT DOCUMENTS

DE     4336858     10/1993

(Continued)

OTHER PUBLICATIONS

International Search Report; PCT/EP2006/063571; pp. 6, Oct. 4, 2006.

(Continued)

*Primary Examiner*—Mahmoud Gimie
(74) *Attorney, Agent, or Firm*—King & Spalding L.L.P.

(57) ABSTRACT

A device for delivering fuel has a fuel delivery unit placed inside a fuel tank and which consists of a swirl pot with a fuel pump situated therein for delivering fuel out via a flow line to an internal combustion engine, and with a ventilation system located inside the fuel tank and serves to withdraw fuel vapors from the fuel tank. This ventilation system consists of ventilation lines and a liquid trap for precipitating fuel. The ventilation lines are arranged with one end in the upper area of the fuel tank, and, with the other end, lead into the liquid trap. An activated charcoal filter located downstream from the liquid trap has a connection to the atmosphere. The liquid trap and the activated charcoal filter are situated next and at the height of the swirl pot. At least the liquid trap is mechanically connected to the swirl pot.

20 Claims, 3 Drawing Sheets

U.S. PATENT DOCUMENTS

| | | | |
|---|---|---|---|
| 5,389,245 A | 2/1995 | Jaeger et al. | 210/139 |
| 5,515,891 A * | 5/1996 | Langlois | 141/307 |
| 5,522,425 A | 6/1996 | Kroiss et al. | 137/590 |
| 6,302,144 B1 | 10/2001 | Graham et al. | 137/565.17 |
| 6,581,578 B2 | 6/2003 | Reiter | 123/516 |
| 6,604,539 B1 | 8/2003 | Strohmayer et al. | 137/43 |
| 6,606,980 B1 | 8/2003 | Walter | 123/509 |
| 6,609,537 B1 | 8/2003 | Horrer et al. | 137/587 |
| 6,698,475 B2 | 3/2004 | Schaefer et al. | 141/325 |
| 7,047,948 B2 | 5/2006 | Gerhardt et al. | 123/516 |
| 2005/0213670 A1 | 9/2005 | Wei | 375/254 |

FOREIGN PATENT DOCUMENTS

| | | |
|---|---|---|
| DE | 19627577 | 7/1996 |
| DE | 19954541 | 11/1999 |
| DE | 10028985 | 6/2000 |
| DE | 10060239 | 12/2000 |
| DE | 10063414 | 12/2000 |
| DE | 10252506 | 11/2002 |
| EP | 0922603 | 12/1998 |
| EP | 1031725 | 2/2000 |
| EP | 1406781 | 6/2002 |
| JP | 2002 021649 A | 1/2002 |
| JP | 2004 251165 A | 9/2004 |
| JP | 2002 048022 A | 2/2005 |
| WO | 00/56564 | 3/2000 |
| WO | 01/30601 | 10/2000 |
| WO | 2005/017340 | 8/2004 |

OTHER PUBLICATIONS

Japanese Office Action, Japan application No. 2008-519898, 12 pages, May 27, 2010.

* cited by examiner

DEVICE FOR DELIVERING FUEL OUT OF A FUEL TANK

CROSS-REFERENCE TO RELATED APPLICATIONS

This application is a U.S. national stage application of International Application No. PCT/EP2006/063571 filed Jun. 27, 2006, which designates the United States of America, and claims priority to German application number 10 2005 031 430.9 filed Jul. 4, 2005, the contents of which are hereby incorporated by reference in their entirety.

TECHNICAL FIELD

The invention relates to a device for delivering fuel out of a fuel tank, comprising a fuel delivery unit, which is arranged inside a fuel tank and which consists of a swirl pot with a fuel pump arranged therein for delivering fuel out of the swirl pot via a feed line to an internal combustion engine, and a venting system, which is arranged inside the fuel tank and serves to lead off fuel vapors from the fuel tank, and which comprises venting lines and a liquid trap for precipitating fuel, wherein the venting lines are arranged with one end in the upper area of the fuel tank and with their other end open out into the liquid trap, an activated charcoal filter being arranged downstream of the liquid trap and having a connection to the atmosphere.

BACKGROUND

Such a device is disclosed by DE 103 35 626 A1. Arranged in a fuel tank is a swirl pot of a fuel delivery unit, in which a fuel pump for delivering fuel out of the swirl pot is connected via a feed line to an internal combustion engine. The device further comprises a venting system, which is arranged inside the fuel tank in order to reduce fuel emissions. The venting system comprises a bubble extraction vessel acting as liquid trap, to which venting lines are connected. The bubble extraction vessel is connected to a flange, so that the venting system is arranged in the upper area of the fuel tank. Connected to the bubble extraction vessel is a line 18, which leads through the flange and to an activated charcoal filter situated outside the fuel tank. After treatment in the activated charcoal filter, the gases from the bubble extraction vessel are led off to the atmosphere via this line. One disadvantage of this is the high assembly cost of this device. For example, the fuel delivery unit has first to be fitted before the venting system can be fitted in the fuel tank. Connecting the fuel feed unit to the bubble extraction vessel proves particularly difficult in this case. Arranging the fuel delivery unit and the venting system is also rendered more difficult by fuel tanks becoming ever shallower.

DE 100 28 985 A1 further discloses a fuel delivery and venting system, in which the swirl pot of a fuel delivery unit is connected to an expansion tank of a venting system. The large dimensions of the expansion tank mean that this fuel delivery and venting system has to be fitted at an intermediate stage during the manufacture of the fuel tank. Fitting the fuel delivery and venting system into the finished fuel tank is not possible, since the size and number of openings on the fuel tank are minimized, because of the fuel emissions associated with these.

SUMMARY

According to an embodiment, a device for delivering fuel out of a fuel tank, may comprise a fuel delivery unit, which is arranged inside a fuel tank and which consists of a swirl pot with a fuel pump arranged therein for delivering fuel out of the swirl pot via a feed line to an internal combustion engine, and a venting system, which is arranged inside the fuel tank and serves to lead off fuel vapors from the fuel tank, and which comprises venting lines and a liquid trap for precipitating fuel, wherein the venting lines are arranged with one end in the upper area of the fuel tank and with their other end open out into the liquid trap, an activated charcoal filter being arranged downstream of the liquid trap and having a connection to the atmosphere, wherein the liquid trap and the activated charcoal filter are arranged laterally next to the swirl pot and on a level with the swirl pot, and wherein at least the liquid trap is mechanically connected to the swirl pot.

According to a further embodiment, the liquid trap and/or the activated charcoal filter can be connected to the swirl pot by means of a snap-locking connection. According to a further embodiment, the liquid trap and/or the activated charcoal filter can be connected to the swirl pot by a cohesive material joint, preferably by welding. According to a further embodiment, at least one area for the liquid trap and/or the activated charcoal filter can be integrally formed on the swirl pot, preferably by injection molding. According to a further embodiment, the activated charcoal filter can be arranged on the liquid trap. According to a further embodiment, the liquid trap and/or the activated charcoal filter can be arranged laterally on one side of the swirl pot. According to a further embodiment, the liquid trap and the activated charcoal filter can be arranged laterally on different sides of the swirl pot. According to a further embodiment, the activated charcoal filter may comprise two vessels connected in series, which are fixed to the swirl pot and/or to the liquid trap. According to a further embodiment, the activated charcoal filter and the liquid trap each may have an open housing sealed by a common cover. According to a further embodiment, the common cover may have an overflow connection between the liquid trap and the activated charcoal filter. According to a further embodiment, in the liquid trap, a roll-over valve can be arranged on the connection to the activated charcoal filter. According to a further embodiment, the activated charcoal filter and the liquid trap may have a lower height than the swirl pot a suction-jet pump for leading off fuel that has collected in the liquid trap may be assigned to the liquid trap. According to a further embodiment, the suction-jet pump can be arranged in the liquid trap. According to a further embodiment, the suction-jet pump can be arranged next to the liquid trap and the intake aperture of the suction-jet pump is connected to the liquid trap. According to a further embodiment, the suction-jet pump may have a motive jet line, which is connected to the feed line of the fuel pump. According to a further embodiment, at least a part of the motive jet line can be formed by the housing of the liquid trap and/or the activated charcoal filter. According to a further embodiment, the aggregate jet of the suction-jet pump may open into the swirl pot. According to a further embodiment, the swirl pot can be connected by way of at least one support to a flange for closing an opening in the fuel tank, the support being pivotally connected to the swirl pot.

BRIEF DESCRIPTION OF THE DRAWINGS

The invention will be explained in more detail with reference to several exemplary embodiments. In the drawings.

DETAILED DESCRIPTION

Figure 1:
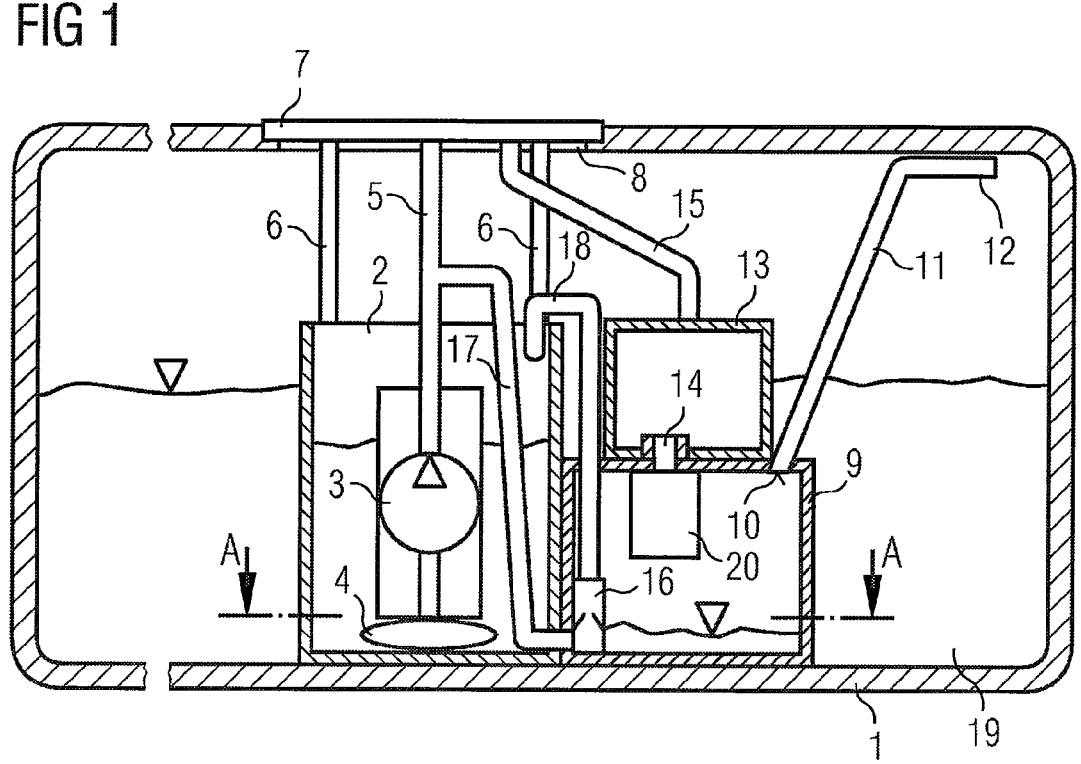
FIG. 1: shows a schematic representation of a section through a fuel tank with the device according to an embodiment.

According to an embodiment, a device can be created which can be fitted even in a finished fuel tank of low overall height. In addition, fitting is to be as easy as possible. According to an embodiment, the liquid trap and the activated charcoal filter are arranged laterally next to the swirl pot and on a level with the swirl pot, and that the liquid trap, at least, is mechanically connected to the swirl pot.

Arranging the liquid trap and the activated charcoal filter laterally next to the swirl pot means that the device according to an embodiment does not need any additional overall space above the swirl pot, so that the device has a low overall height, making it especially suitable for use in shallow fuel tanks. The arrangement of the swirl pot, the liquid trap and the activated charcoal filter permits a modular construction and hence a wide range of possible adaptations for various applications. Incorporating the activated charcoal filter into the device simplifies assembly owing to the modular construction. No additional attachments of the activated charcoal filter to the motor vehicle and outside the fuel tank are required. In addition, the arrangement of the activated charcoal filter inside the fuel tank has the advantage that the emissions caused by the fuel system are thereby reduced, due to the absence of any connection points outside the fuel tank.

The connection of the liquid trap and/or the activated charcoal filter is especially easy to configure if they are connected to the swirl pot by means of a snap-locking connection. The connection to the swirl pot is easy to make, especially when fitting the liquid trap and the activated charcoal filter to the swirl pot inside the fuel tank.

The provision of snap-locking elements on the swirl pot, on the liquid trap and/or on the activated charcoal filter can be dispensed with, if the liquid trap and/or the activated charcoal filter are connected to the swirl pot by a cohesive material joint, preferably by welding.

Any additional connection of the liquid trap and/or the activated charcoal filter is avoided, if at least one area for the liquid trap and/or the activated charcoal filter is integrally formed on the swirl pot. Where the swirl pot is produced by injection molding, the integral connection can readily be achieved in that at least one area is likewise produced by injection molding during the manufacture of the swirl pot.

In another advantageous development the activated charcoal filter is arranged on the liquid trap. Where the liquid trap and the activated charcoal filter have a low overall height, it has proved advantageous to arrange the activated charcoal filter above the liquid trap. Since the fuel vapors in the liquid trap collect in the upper area anyway, a costly connection between the cold trap and the activated charcoal filter can be dispensed with. The connection arranged in the upper area moreover affords a good safeguard against fuel from the cold trap getting into the activated charcoal filter.

In another development a device that can be readily inserted through an opening in the fuel tank is achieved in that the liquid trap and/or the activated charcoal filter are arranged laterally on one side of the swirl pot. In this case the activated charcoal filter is advantageously arranged on the side of the liquid trap opposite the swirl pot.

In a likewise simple development the liquid trap and the activated charcoal filter are arranged laterally on different sides of the swirl pot. The position of the liquid trap and the activated charcoal filter can here be adjusted within wide limits to suit the space available in the fuel tank, making the device according to an embodiment versatile in use.

In order to make it easy to insert into the fuel tank, on the one hand, and to give it an adequate filter capacity on the other, the activated charcoal filter comprises two vessels connected in series, which are fixed to the swirl pot and/or to the liquid trap. The two vessels of the activated charcoal filter may be arranged either on different sides or on one side of the swirl pot.

Fitting the activated charcoal filter and the liquid trap as individual sub-assemblies is facilitated if they each have an open housing sealed by a common cover.

When the activated charcoal filter is arranged next to the liquid trap, a connection between the activated charcoal filter and the liquid trap is particularly easy to accomplish if the common cover has an overflow connection between the activated charcoal filter and the liquid trap.

In order to prevent fuel getting into the activated charcoal filter, should the motor vehicle be in an overturned position, a roll-over valve is arranged in the connection between the liquid trap and the activated charcoal filter. The roll-over valve is easy to fit if it is arranged in the liquid trap.

An especially easy insertion of the device into the fuel tank is achieved in an arrangement of the activated charcoal filter and the liquid trap on one side of the swirl pot, if the activated charcoal filter and the liquid trap have a lower height than the swirl pot, preferably less than two thirds the height of the swirl pot.

For leading off fuel that has collected in the liquid trap, the liquid trap has a drain valve. A reliable draining of the fuel from the liquid trap is achieved by an active extraction, preferably by a suction-jet pump assigned to the liquid trap.

The suction-jet pump is easy to fit if it is arranged in the liquid trap.

In another development, a reduction in the useable volume of the liquid trap is avoided in that the suction-jet pump is arranged next to the liquid trap and the intake aperture of the suction-jet pump is connected to the liquid trap.

For operation of the suction-jet pump, it has a motive jet line, which is connected to the feed line of the fuel pump.

The time taken to fit the suction-jet pump can be shortened if at least a part of the motive jet line is formed by the housing of the liquid trap and/or the activated charcoal filter. The omission of at least parts of the motive jet line permits more cost-effective manufacture of the device.

According to a further advantageous development the aggregate jet of the suction-jet pump opens into the swirl pot.

An especially easy insertion of the device into the fuel tank is achieved in that the swirl pot is connected by way of at least one support to a flange for closing an opening in the fuel tank, the support being pivotally connected to the swirl pot. The pivotal attachment of the support to the swirl pot allows simultaneous swiveling of the device from a pivoted position into the fitted position during the insertion process.

A swirl pot 2 with a fuel pump 3 fixed therein is arranged in the fuel tank 1 represented in FIG. 1. A pump pre-filter 4, via which the fuel pump 3 draws fuel and delivers it via a feed line 5 to an internal combustion engine (not shown) of a motor vehicle, is connected to the inlet side of the fuel pump 3. The swirl pot is pre-tensioned by two supports 6 against the bottom of the fuel tank 1. The supports are supported in a flange 7, which closes an opening 8 in the fuel tank 1.

A liquid trap 9 is arranged laterally next to the swirl pot 2 and at the bottom of the fuel tank 1. In this schematic representation, an end 10 of just one venting line 11 opens out in the upper area of the liquid trap 9, the entire venting system comprising multiple venting lines. The other end 12 of the venting line 11 is led into the upper area of the fuel tank 1. An activated charcoal filter 13 is fixed to the top of the liquid trap 9. The liquid trap 9 is connected to the activated charcoal filter 13 by a connection 14. A line 15 connects the activated charcoal filter 13 to the atmosphere, the line 15 being led out of the fuel tank 1 through the flange 7. Also arranged in the liquid trap 9 is a suction-jet pump, which is driven by way of a motive fluid line 17, which branches off from the feed line 5. The aggregate jet line 16 connected to the suction-jet pump 16 opens into the swirl pot 2.

In operation of the device the fuel pump 3 delivers fuel 19 to the internal combustion engine via the feed line 5. The fuel vapor collecting in the upper area of the fuel tank 1 is led via the venting line 11 into the liquid trap 9. In the liquid trap 9 fuel which collects in the lower area of the liquid trap 9 is separated off from the fuel vapor. This fuel is extracted by the suction-jet pump 9 and is led via the aggregate jet line 18 to the swirl pot 2. The remaining gases flow via the connection 14 into the activated charcoal filter 13, a roll-over valve 20 being arranged on the connection 14 in the liquid trap 9. The gases treated in the activated charcoal filter 13 are then given off to the atmosphere via the line 15.

Figure 2:
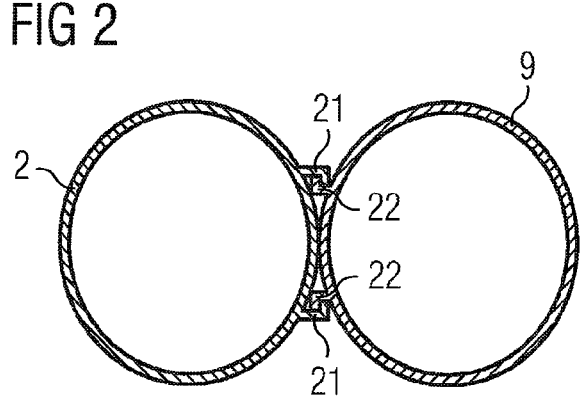
FIG. 2: shows a section A-A through the device in FIG. 1, FIG. 3: shows a second embodiment of the device according to FIG. 1, FIG. 4: shows a section B-B through the device in FIG. 3, FIG. 5: shows a third embodiment of the device according to FIG. 1, FIG. 6: shows a section C-C from FIG. 5 and FIG. 7: shows a fourth embodiment of the device in a top view.

The section A-A represented in FIG. 2 shows a simplified representation in top view. The liquid trap 9 is arranged laterally next to the swirl pot 2. The swirl pot 2 and the liquid trap 9 are mechanically connected to one another via snap-locking elements 21 formed on the swirl pot 2 and correspondingly designed snap-locking points 22 on the liquid trap 9. The liquid trap 9 and the swirl pot 2 can therefore be inserted in succession through the opening 8 into the fuel tank 1, and then connected together by means of the snap-locking elements 21, 22.

Figure 3:
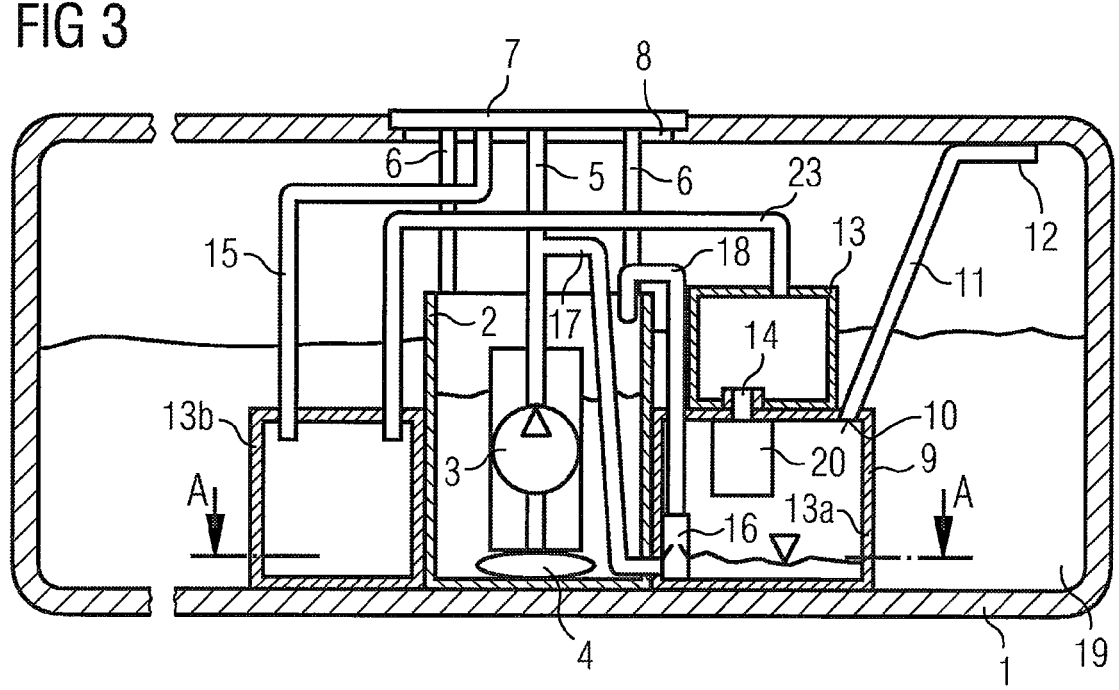

The device according to FIG. 3 substantially corresponds to the device according to FIG. 1. In contrast to FIG. 1, the activated charcoal filter 13 has a larger volume, which for ease of assembly is divided between two vessels 13a, 13b, which are connected in succession. The two vessels 13a, 13b are arranged on both sides of the swirl pot 2 and are connected to a line 23. In the representation shown, the axes of symmetry of the vessels 13a, 13b and the swirl pot 2 lie in the plane of projection. However, the vessels 13a, 13b can also be arranged at an angle of less than 180° to one another on the circumference of the swirl pot 2, depending on the space available in the fuel tank 1.

Figure 4:
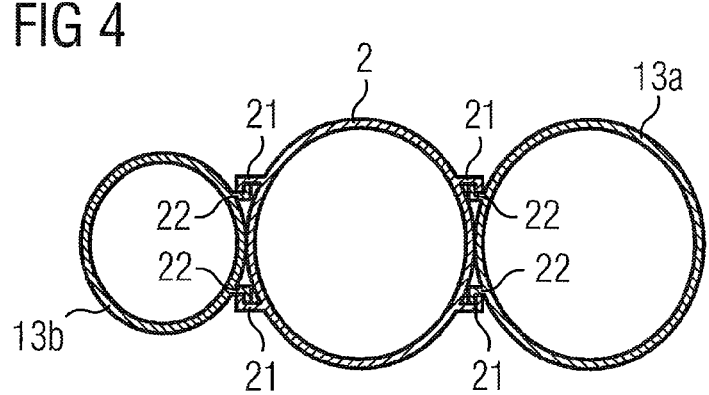

The section B-B in FIG. 4 shows a top view of the device. Snap-locking elements 21 formed on opposite sides of the swirl pot 2 engage in correspondingly designed snap-locking points 22 on the vessels 13a, 13b of the activated charcoal filter. Fitting is likewise relatively simple in that the vessel 13a, for example, is first inserted into the fuel tank 1. The swirl pot 2 is then inserted and connected to the vessel 13a. Once the half-assembled device has been pushed to the side, the vessel 13b can easily be inserted into the fuel tank 1 through the opening 8 and connected to the swirl pot 2.

Figure 5:
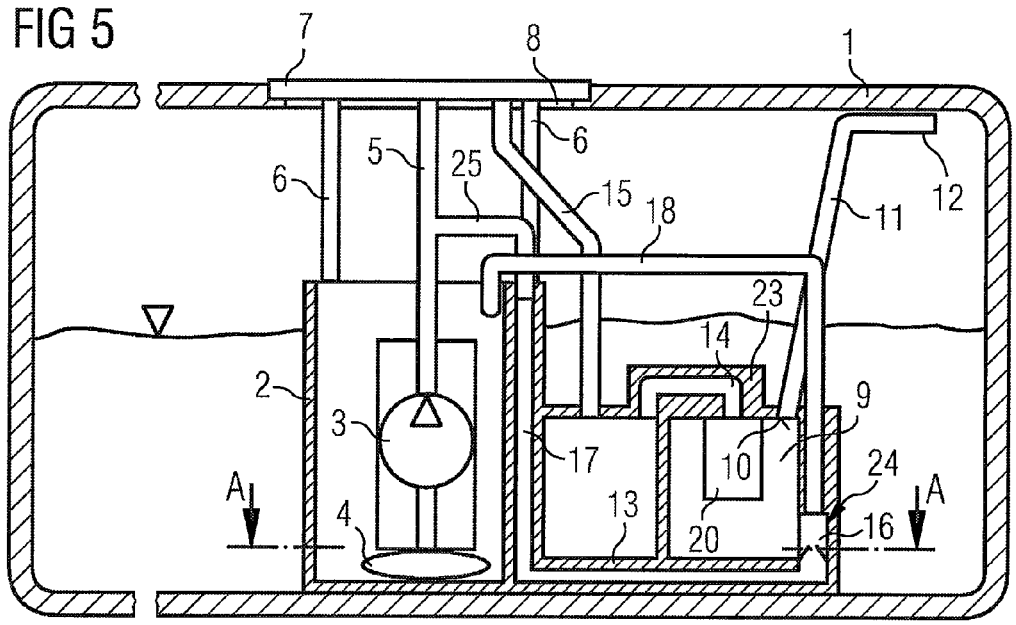
Figure 6:
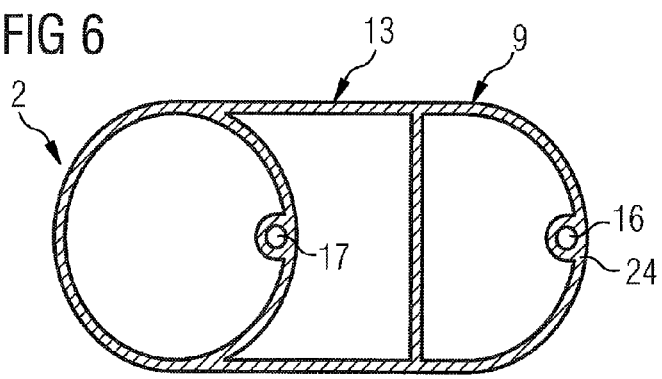

The device in FIG. 5 has a swirl pot 2 of modified construction compared to the device in FIG. 1. The swirl pot 2, the liquid trap 9 and the activated charcoal filter 13 are integrally connected to one another, in that they have a common housing, which is manufactured by injection molding. The housing has a lower height in the area of the liquid trap 9 and the activated charcoal filter 13 than in the area of the swirl pot 2. With this housing configuration the device can be inserted into the fuel tank 1 through the opening 8. The liquid trap 9 and the activated charcoal filter 13 have a common cover 23, which seals the housing in this area. An overflow connection 14 arranged in the cover 23 connects the liquid trap 9 to the activated charcoal filter 13. In the housing, a seat 24, into which the suction-jet pump 16 is inserted, is molded on in the area of the liquid trap 9. The motive jet line 17 for operation of the suction-jet pump 16 is likewise inserted into the housing, so that no additional motive fluid line needs to be arranged. A connecting line 25 is provided only from the feed line 5 to the start of the motive fluid line in the housing. FIG. 6 shows a top view of the housing of the device in FIG. 5 in the section C-C.

Figure 7:
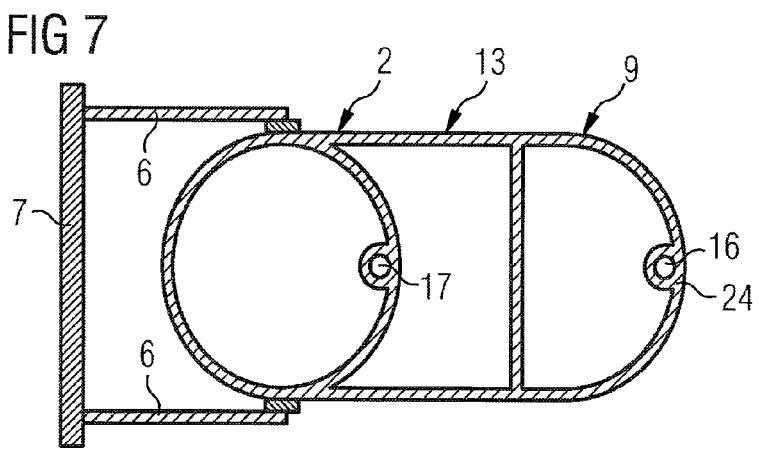

FIG. 7 shows a further embodiment of the device, in which the supports 6 are pivotally fixed to the housing in the area of the swirl pot 2. In the representation shown, the supports with the flange 7 are pivoted by 90° into the plane of projection ready for fitting, so as to facilitate insertion of the device into the fuel tank 1. As soon as the housing has been inserted into the fuel tank through the opening 8, the supports 6 with the flange are swiveled back, so that the device corresponds to the device shown in FIG. 5. This embodiment does not confine the provision of the pivotal supports 6 to the housing configuration shown. The pivotal arrangement of the supports 6 is also possible when vessels are arranged on opposite sides of the swirl pot 2, as in FIG. 4, it also being possible to arrange the pivotal support on one of the vessels.

What is claimed is:

1. A device for delivering fuel out of a fuel tank, comprising a fuel delivery unit, which is arranged inside a fuel tank and which consists of a swirl pot with a fuel pump arranged therein for delivering fuel out of the swirl pot via a feed line to an internal combustion engine, and a venting system, which is arranged inside the fuel tank and serves to lead off fuel vapors from the fuel tank, and which comprises venting lines and a liquid trap for precipitating fuel, wherein the venting lines are arranged with one end in the upper area of the fuel tank and with their other end open out into the liquid trap, an activated charcoal filter being arranged downstream of the liquid trap and having a connection to the atmosphere, wherein the liquid and the activated charcoal filter are arranged laterally next to the swirl pot and on a level with the swirl pot, and wherein at least the liquid trap is mechanically connected to the swirl pot.

2. The device according to claim 1, wherein the liquid trap and/or the activated charcoal filter are connected to the swirl pot by means of a snap-locking connection.

3. The device according to claim 1, wherein the liquid trap and/or the activated charcoal filter are connected to the swirl pot by a cohesive material joint, preferably by welding.

4. The device according to claim 3, wherein at least one area for the liquid trap and/or the activated charcoal filter is integrally formed on the swirl pot, preferably by injection molding.

5. The device according to claim 1, wherein the activated charcoal filter is arranged on the liquid trap.

6. The device according to claim 1, wherein the liquid trap and/or the activated charcoal filter are arranged laterally on one side of the swirl pot.

7. The device according to claim 1, wherein the liquid trap and the activated charcoal filter are arranged laterally on different sides of the swirl pot.

8. The device according to claim 1, wherein the activated charcoal filter comprises two vessels connected in series, which are fixed to the swirl pot and/or to the liquid trap.

9. The device according to claim 1, wherein the activated charcoal filter and the liquid trap each have an open housing sealed by a common cover.

10. The device according to claim 9, wherein the common cover has an overflow connection between the liquid trap and the activated charcoal filter.

11. The device according to claim 1, wherein in the liquid trap, a roll-over valve is arranged on the connection to the activated charcoal filter.

12. The device according to claim 1, wherein the activated charcoal filter and the liquid trap have a lower height than the swirl pot.

13. The device according to claim 1, wherein a suction-jet pump for leading off fuel that has collected in the liquid trap is assigned to the liquid trap.

14. The device according to claim 13, wherein the suction-jet pump is arranged in the liquid trap.

15. The device according to claim 13, wherein the suction-jet pump is arranged next to the liquid trap and the intake aperture of the suction-jet pump is connected to the liquid trap.

16. The device according to claim 1, wherein the suction-jet pump has a motive jet line, which is connected to the feed line of the fuel pump.

17. The device according to claim 1, wherein at least a part of the motive jet line is formed by the housing of the liquid trap and/or the activated charcoal filter.

18. The device according to claim 1, wherein the aggregate jet of the suction-jet pump opens into the swirl pot.

19. The device according to claim 1, wherein the swirl pot is connected by way of at least one support to a flange for closing an opening in the fuel tank, the support being pivotally connected to the swirl pot.

20. A method for delivering fuel out of a fuel tank, comprising the steps of:

arranging a fuel delivery unit inside a fuel tank the fuel delivery unit comprising a swirl pot with a fuel pump arranged therein for delivering fuel out of the swirl pot via a feed line to an internal combustion engine, arranging a venting system inside the fuel tank and for leading off fuel vapors from the fuel tank, wherein the venting system comprises venting lines, a liquid trap for precipitating fuel, wherein the venting lines are arranged with one end in the upper area of the fuel tank and with their other end open out into the liquid trap, and an activated charcoal filter being arranged downstream of the liquid trap and having a connection to the atmosphere, wherein the liquid trap and the activated charcoal filter are arranged laterally next to the swirl pot and on a level with the swirl pot, and at least the liquid trap is mechanically connected to the swirl pot.

* * * * *